United States Patent [19]
Kato

[11] Patent Number: 5,642,873
[45] Date of Patent: Jul. 1, 1997

[54] FLUID-FILLED ELASTIC MOUNT HAVING PUSHING MEMBER FOR CONTROLLING FLUID COMMUNICATION THROUGH ORIFICE PASSAGE

[75] Inventor: Rentaro Kato, Kasugai, Japan

[73] Assignee: Tokai Rubber Industries, Ltd., Japan

[21] Appl. No.: 618,772

[22] Filed: Mar. 20, 1996

[30]  Foreign Application Priority Data

Mar. 29, 1995  [JP]  Japan ..................... 7-071612

[51] Int. Cl.⁶ .................... F16M 5/00; B60G 13/00
[52] U.S. Cl. ........................ 267/140.14; 267/219
[58] Field of Search ..................... 267/140.14, 140.3, 267/219, 141.2, 141.6; 248/562, 636; 180/300

[56]  References Cited

U.S. PATENT DOCUMENTS

| | | |
|---|---|---|
| 4,660,812 | 4/1987 | Dan et al. . |
| 4,756,513 | 7/1988 | Carlson et al. ............... 267/140.14 |
| 4,872,652 | 10/1989 | Rohner et al. . |
| 5,167,403 | 12/1992 | Muramatsu et al. . |
| 5,180,148 | 1/1993 | Muramatsu . |

FOREIGN PATENT DOCUMENTS

| | | |
|---|---|---|
| 59-93537 | 5/1984 | Japan . |
| 59-117929 | 7/1984 | Japan . |
| 60-104824 | 6/1985 | Japan . |
| 60-169323 | 9/1985 | Japan . |
| 3-89044 | 4/1991 | Japan ............... 267/140.14 |

*Primary Examiner*—Lee W. Young
*Attorney, Agent, or Firm*—Parkhurst, Wendel & Burr, L.L.P.

[57]  ABSTRACT

A fluid-filled elastic mount (10) wherein a fluid-tight space (40) defined by two mounting members (12, 14), an elastic body (16) and a flexible diaphragm (36) is divided by a partition member (34) into pressure-receiving and an equilibrium chambers (44, 46) communicating with each other through a first orifice (64). The partition member has a communication hole (62) for fluid communication of the first orifice with the equilibrium chamber. The elastic mount has a cover member (76) which cooperates with the diaphragm to define a space in which a pushing member (84) is accommodated such that it is pressed onto the diaphragm by a biasing member (86), so that the diaphragm closes the communication hole. The pushing member cooperates with a rubber plate (94) to divide the space within the cover member into static pressure and operating chambers (96, 100), and the pushing member is sucked toward the cover member by a negative pressure applied to the operating chamber, so that the diaphragm is displaced away from the communication hole to open the same for fluid communication of the orifice with the equilibrium chamber.

13 Claims, 2 Drawing Sheets

5,642,873

FLUID-FILLED ELASTIC MOUNT HAVING PUSHING MEMBER FOR CONTROLLING FLUID COMMUNICATION THROUGH ORIFICE PASSAGE

BACKGROUND OF THE INVENTION

1. Field of the Invention

The present invention generally relates to a fluid-filled elastic mount adapted to provide a vibration damping effect on the basis of flows or resonance of a fluid which is forced to flow through an orifice passage. More particularly, the present invention is concerned with such a fluid-filled elastic mount which is capable of changing damping characteristics by controlling fluid communication of the orifice passage or passages with fluid chambers.

2. Discussion of the Prior Art

As one type of a vibration damper interposed between two members of a vibration system, there is known a fluid-filled elastic mount as disclosed in JP-A-60-104824, wherein a first and a second mounting member which are attached to the respective two members of the vibration system in a vibration damping manner are spaced apart from each other by a suitable distance and are elastically connected to each other by an elastic body. The elastic mount further includes a partition member which is supported by the second mounting member. A pressure-receiving chamber which is partially defined by the elastic body is formed on one side of the partition member, while a variable-volume equilibrium chamber which is partially defined by a flexible diaphragm is formed on the other side of the partition member. These pressure-receiving and equilibrium chambers are filled with a suitable non-compressible fluid, and communicate with each other by an orifice passage. A pressure of the fluid in the pressure-receiving chamber changes due to elastic deformation of the elastic body upon application of vibrations to the elastic mount. This type of the elastic mount provides a high damping or isolating effect based on resonance of the fluid flowing through the orifice passage, which effect cannot be provided by an elastic mount that relies upon only the elasticity of the elastic body for damping the input vibrations. For this reason, the elastic mount of this type is favorably used as an engine mount for a motor vehicle, for example.

Generally, a fluid-filled elastic mount when used as a vehicle engine mount is required to exhibit different damping or isolating characteristics depending on the type of the input vibrations having different frequencies and amplitudes. However, the range of frequency of the input vibrations that can be effectively damped by fluid flows through an orifice passage is relatively narrow. Therefore, a fluid-filled elastic mount using a single orifice passage is not generally capable of exhibiting desired damping characteristics to a satisfactory extent.

Another type of the fluid-filled elastic mount is disclosed in JP-A-60-169323. Described in detail, the elastic mount has a support rod which is secured at one axial end thereof to a central portion of the flexible diaphragm, and supports a valve element at the other axial end, so that the valve element is opposed to an opening of the orifice passage. The diaphragm is covered with a cover member so as to define an air-tight operating chamber therebetween. In the thus formed operating chamber, there is disposed a coil spring which downwardly biases the support rod such that the valve element provided at the other axial end of the support rod closes the opening of the orifice passage. In the meantime, when the operating chamber is connected to a suitable vacuum source, the support rod is retracted toward the cover member against the biasing force of the coil spring so that the valve element is released away from the opening of the orifice passage to permit fluid communication therethrough.

In the thus constructed engine mount, the orifice passage is selectively controlled to be operative and inoperative for permitting and inhibiting the fluid communication therethrough, by the valve element as described above, to thereby adjust the vibration damping characteristics based on the fluid flows through the orifice passage.

In the elastic mount constructed as described above, the valve element or valve means needs to be disposed within the pressure-receiving chamber or equilibrium chamber, undesirably leading to a complicated structure, an increased cost of manufacture and lowered production efficiency of the elastic mount. Further, the elastic mount inevitably tends to be large-sized. In the above-constructed elastic mount, since the flexible diaphragm partially defines the operating chamber, the diaphragm is directly exposed to the reduced pressure in the operating chamber when the operating chamber is connected to the vacuum source for retracting the valve element away from the opening of the orifice passage. This arrangement results in considerable deterioration of a degree of elastic deformation of the diaphragm, i.e., deterioration of its capability to permit a volume change of the equilibrium chamber. Accordingly, the fluid is not likely to effectively flow through the orifice passage, whereby the elastic mount does not exhibit the intended vibration damping effect.

Another type of the fluid-filled elastic mount is disclosed in JP-A-59-93537 and JP-A-59-117929, wherein communication holes of the orifice passage for fluid communication with the equilibrium chamber are opposed to a central portion of the flexible diaphragm, while a bag-like elastic body is disposed adjacent to the central portion of the diaphragm on one of the opposite sides thereof remote from the equilibrium chamber. In this bag-like elastic body, there is formed an air-tight operating chamber. The bag-like elastic body is displaced in opposite directions toward and away from the diaphragm, by selectively supplying and discharging a pressurized medium (hydraulic pressure) to and from the operating chamber, so that the diaphragm is pressed onto or retracted from the communication holes for closing or opening the same. Thus, the orifice passage is selectively controlled to be operative or inoperative for permitting or inhibiting the fluid communication therethrough.

In the above type of the elastic mount, it is required to supply the pressurized medium having a relatively high positive pressure to the operating chamber, so as to obtain a sufficiently large amount of force for pressing the diaphragm onto the communication holes to close the same. In general, in the motor vehicle equipped with an internal combustion engine, it is rather difficult to obtain compressed air having a positive pressure which is higher than the atmospheric pressure, while it is rather easy to obtain a negative or reduced air pressure which is lower than the atmospheric pressure. In other words, it is difficult to obtain a sufficient amount of compressed air having a positive pressure to be supplied to the operating chamber for pressing the diaphragm onto the communication holes so as to close the same, against a pressure of the fluid flowing through the orifice passage. In this case, the orifice passage may not be fully closed with high stability. When a relatively large positive pressure is applied to the operating chamber, the wall of the operating chamber may be outwardly expanded or deformed, adversely influencing the degree of displacement of the diaphragm, i.e., its capability to permit a volume change of the equilibrium chamber. Accordingly, the elastic mount may not exhibit the intended vibration damping or isolating characteristics.

In an attempt to effectively obtain the pressing force for pressing the diaphragm onto the communication holes, it is considered possible to utilize the elasticity of the bag-like elastic body, by disposing the elastic body in a compressed state, for instance. In case where the bag-like elastic body has a wall thickness large enough to exhibit effective elasticity for pressing the diaphragm, the bag-like elastic body would not likely to be easily deformed upon application of the reduced pressure to the operating chamber formed in the elastic body. In this case, the communication holes may not be fully opened for the fluid communication through the orifice passage. When the bag-like elastic body is kept in the compressed state, the pressing force provided by the elasticity of the bag-like elastic body would be undesirably lowered in a relatively short period due to creep of the rubber material of the elastic body. Accordingly, the orifice passage would not be adequately controlled to be selectively operative or inoperative for permitting or inhibiting the fluid communication therethrough.

SUMMARY OF THE INVENTION

The present invention was developed in the light of the above situation. It is therefore an object of the invention to provide a fluid-filled elastic mount which has a simple mechanism for stably controlling the orifice passage to be operative or inoperative for effecting or inhibiting the fluid communication between the fluid chambers, and which elastic mount is capable of controlling the fluid communication of the orifice passage with improved durability and operating reliability.

The above object of the invention may be achieved according to the principle of the present invention, which provides a fluid-filled elastic mount comprising: a first and a second mounting member which are spaced apart from each other; an elastic body which elastically connects the first and second mounting members; a partition member supported by the second mounting member and cooperating with the elastic body to define a pressure-receiving chamber filled with a non-compressible fluid; a flexible diaphragm cooperating with the partition member to define an equilibrium chamber on one of the opposite sides of the partition member remote from the pressure-receiving chamber, the equilibrium chamber being filled with the non-compressible fluid; the partition member having a first orifice communicating with the pressure-receiving chamber and the equilibrium chamber so as to permit flows of the fluid therebetween, the partition member further having at least one communication hole which is open to a central portion of the diaphragm for fluid communication of the first orifice with the equilibrium chamber; a cover member including a cylindrical portion and a bottom portion, the bottom portion closing one of opposite axial ends of the cylindrical portion, the cover member being supported by the second mounting member at the other axial end of the cylindrical portion so as to partially define a space between the diaphragm and the bottom portion; a pushing member accommodated in a central portion of the space such that the pushing member is displaceable in a direction toward and away from the communication hole with the diaphragm being interposed therebetween; a biasing member disposed between the pushing member and the bottom portion of the cover member, for forcing the pushing member onto the diaphragm so that the diaphragm closes the communication hole; an annular rubber plate disposed in a radial space defined by and between an outer peripheral portion of the pushing member and the cylindrical portion of the cover member, such that the rubber plate is free from internal stresses, the rubber plate cooperating with the pushing member to divide the space within the cover member into a static pressure chamber partially defined by the diaphragm, and an air-tightly closed operating chamber partially defined by the bottom portion of the cover member; the pushing member being sucked toward the bottom portion of the cover member by a negative pressure applied to the operating chamber, so that the diaphragm is displaced away from the communication hole so as to open the communication hole for fluid communication of the first orifice with the equilibrium chamber.

In the fluid-filled elastic mount constructed according to the present invention, the communication hole of the partition member is closed by the flexible diaphragm which is forced against the partition member by the pushing member. Thus, the present elastic mount does not require any valve means disposed in the pressure-receiving chamber or equilibrium chamber for opening and closing the communication hole, and permits the first orifice to be selectively enabled and disabled, with a simple structure.

In the present elastic mount, the operating chamber is not defined by the flexible diaphragm. When the negative pressure is applied to the operating chamber for opening the communication hole to enable the first orifice to function, the diaphragm is not exposed to the negative pressure, thus having increased durability. In other words, the diaphragm exhibits a high degree of freedom of elastic deformation to permit an effective volume change of the equilibrium chamber, whereby the elastic mount effectively exhibits the intended vibration damping characteristics.

The pushing member is forced onto the diaphragm by a biasing force of the biasing member disposed in the operating chamber, so that the communication hole of the first orifice is closed by the diaphragm. In this arrangement, it is not required to apply pressure medium having a relatively high pressure to the operating chamber for pressing the pushing member onto the diaphragm. Thus, the present elastic mount can be operated in a simplified manner for opening and closing the first orifice. Further, the diaphragm can be freely deformed without being adversely influenced by the pressure medium having high pressure, whereby the present elastic mount exhibits excellent vibration damping effects with high stability.

In the elastic mount of the present invention, the rubber plate which partially defines the static pressure chamber and the operating chamber is disposed in the cover member such that the rubber plate is substantially free from internal stresses and that the rubber plate extends in a radial direction of the cover member substantially perpendicular to the direction in which the pushing member is displaced. In this arrangement, the rubber plate is adapted to undergo shearing deformation upon retracting movement of the pushing member. This arrangement is effective to reduce or avoid occurrence of creep in the rubber plate, and accordingly, the control of opening or closing the communication hole by the pushing member is not adversely influenced by the creep of the rubber plate. In addition, the rubber plate is likely to be easily deformed when the pushing member is displaced downwardly, whereby the orifice passage is enabled for fluid communication therethrough by application of a relatively low level of the negative pressure to the operating chamber. Accordingly, the vibration damping characteristics can be advantageously and stably changed depending upon the input vibrations while exhibiting an improved durability.

The biasing member disposed between the pushing member and the bottom portion of the cover member may preferably consist of a coil spring.

According to a first preferred form of the invention, the pushing member has a pressure plate formed as an integral part thereof at an open end thereof so as to extend radially outwardly of the pushing member, the rubber plate being disposed in an annular space between an outer peripheral portion of the pressure plate and the cylindrical portion of the cover member. In this arrangement, a suction force based on the negative pressure applied to the operating cheer effectively acts on the pushing member in the presence of the pressure plate, leading to a further accurate control to open and close the first orifice.

According to a second preferred form of the invention, the pushing member has an inverted cup shape which is open to the bottom portion of the cover member, the biasing member such as a coil spring being accommodated in the inverted cup shape of the pushing member. In this arrangement, the inverted-cup-shaped pushing member advantageously provides a space for accommodating the biasing member therein, making it possible to employ a coil spring, for example, which exhibits a large amount of biasing force, without increasing the size of the elastic mount.

According to a third preferred form of the invention, the pushing member has a metal ring secured to an outer peripheral portion of the rubber plate, the metal ring being press-fitted in the cylindrical portion of the cover member so that the outer peripheral portion of the rubber plate is fixed to the cylindrical portion of the cover member via the metal ring. In this arrangement, the rubber plate is easily assembled with the cover member, assuring a simplified structure and improved production efficiency of the elastic mount.

According to a fourth preferred form of the invention, the elastic mount further includes a second orifice for fluid communication between the pressure-receiving chamber and the equilibrium chamber, the second orifice having a ratio A/L lower than that of the first orifice, wherein "A" represents a cross sectional area of fluid flow through the first and second orifices, and "L" represents a length of the orifices. In this arrangement, the fluid is caused to flow through first orifice and the second orifice selectively, by selectively opening and closing the communication hole of the first orifice passage. Thus, the present elastic mount is capable of providing excellent damping effects over a wide range of frequency of the input vibrations, by selectively utilizing the fluid flows through the first orifice passage and the fluid flows through the second orifice passage.

BRIEF DESCRIPTION OF THE DRAWINGS

The above and other object, features and advantages of the present invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
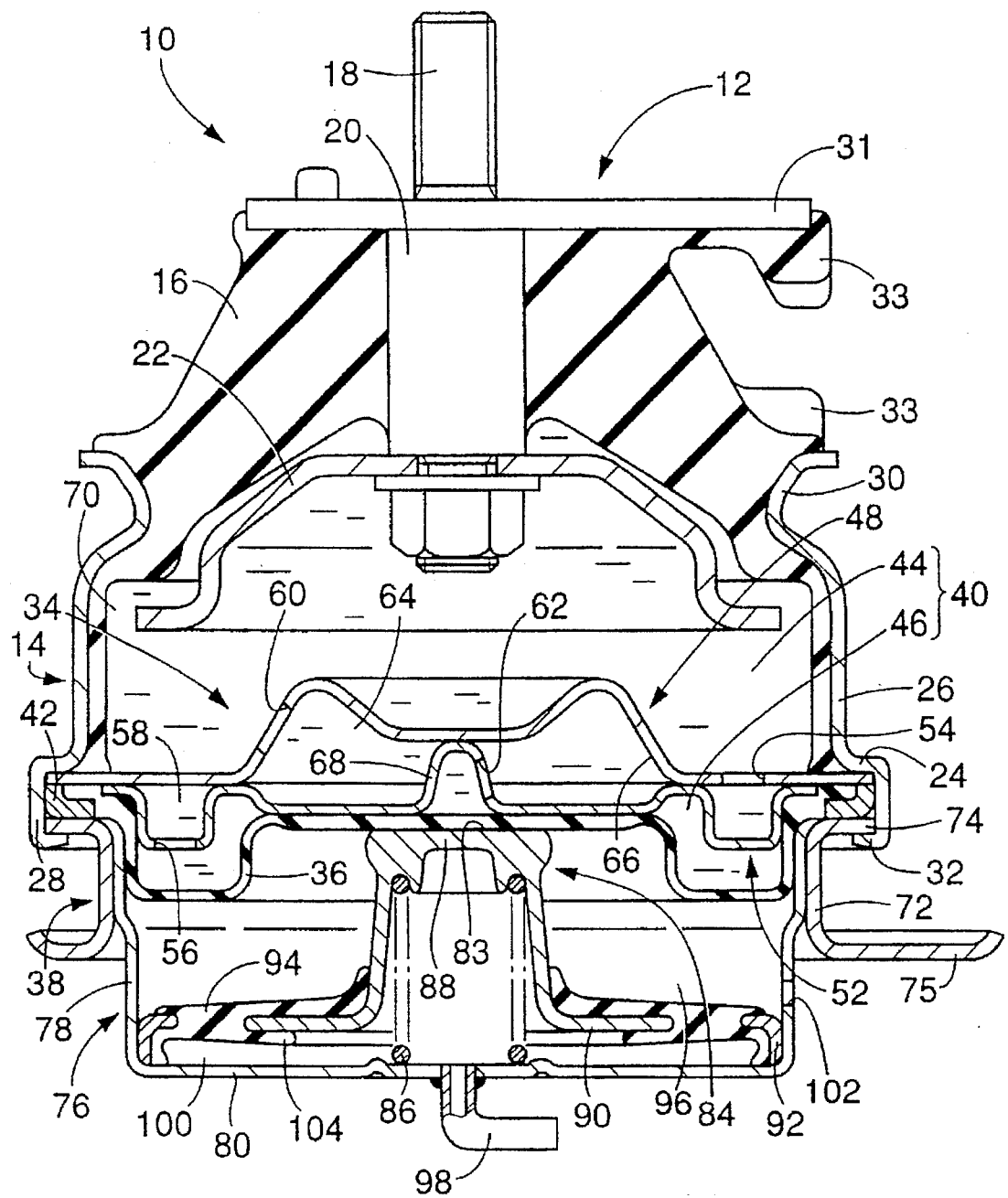
FIG. 1 is an elevational view in longitudinal or axial cross section of an engine mount constructed according to one embodiment of the invention.

Referring first to FIG. 1, there is shown one embodiment of a fluid-filled elastic mount of the present invention in the form of an engine mount 10 for use on a motor vehicle. The engine mount 10 has a first mounting member 12 and a second mounting member 14 which are made of metal and spaced apart from each other by a suitable distance in the axial direction of the engine mount 10. Between the first and second mounting members 12, 14, there is interposed an elastic body 16, such that the first and second mounting members 12, 14 are elastically connected to each other by the elastic body 16. The present engine mount 10 is installed on the motor vehicle such that the first mounting member 12 is attached to one of a power unit and a body of the vehicle while the second mounting member 14 is attached to the other of the power unit and the vehicle body, so that the power unit is mounted on the vehicle via the engine mount 10 in a vibration damping or isolating manner.

When the engine mount 10 is installed on the vehicle as described above, the weight of the power unit acts on the engine mount 10 in the vertical direction as seen in FIG. 1, whereby the elastic body 16 is deformed so that the first and second mounting members 12, 14 are displaced toward each other in the vertical direction by a suitable amount. The engine mount 10 receives a vibrational load primarily in the substantially vertical direction as seen in FIG. 1. This direction will be referred to as "load-receiving direction" where appropriate.

The first mounting member 12 has a generally circular shape. A mounting bolt 18 is secured to the first mounting member so as to protrude from a central portion of the first mounting member 12, in the axially upward direction of the engine mount 10 while a support rod 20 is secured to the first member 12 so as to protrude from the central portion in the axially downward direction of the engine mount 10. A hat-shaped resonance member 22 is secured by calking to a lower axial end of the support rod 20. This resonance member 22 generally extends from the support rod 20 radially outwardly in a direction substantially perpendicular to the load-receiving direction. The first mounting member 12 is attached to the power unit (not shown) through the mounting bolt 18.

The second mounting member 14 is a generally cylindrical member having a relatively large diameter. The second mounting member 14 has a shoulder 24 at an axially intermediate portion thereof, and includes a small-diameter portion 26 on the upper side of the shoulder 24, and a large-diameter portion 28 on the lower side of the shoulder 24. The small-diameter portion 26 has a constricted part 30 near an upper open end of the second mounting member 14. The constricted part 30 consists of a curved projection which protrudes radially inwardly of the small-diameter portion 26. The large-diameter portion 28 has a calking part 32 at a lower open end of the second mounting member 14.

The first mounting member 12 is spaced-apart from the second mounting member 14 in the axial direction, by a suitable distance from the upper end of the second mounting member 14. The elastic body 16 interposed between these two members 12, 14 has a generally frustoconical shape, and is bonded at its small-diameter end face to the first mounting member 12 and at the outer circumferential surface of its large-diameter end to the inner circumferential surface of the constricted part 30 of the second mounting member 14, during vulcanization of a rubber material of the elastic body 16. Thus, the first mounting member 12, second mounting member 14 and elastic body 16 are formed into an integral intermediate product by means of the vulcanization, so that the upper open end of the second mounting member 14 is fluid-tightly closed by the elastic body 16. The support rod 20 protrudes from the large-diameter end face of the elastic body 16, and the resonance member 22 secured by calking to the lower end of the support rod 20 is accordingly disposed within the second mounting member 14.

The first mounting member 12 has a stop part 31 formed at a portion of its outer circumferential portion. Described more specifically, the stop part 31 protrudes radially outwardly of the first mounting member 12, and is opposed to the upper open end of the second mounting member 14, with a suitable distance therebetween in the load-receiving direction. Further, there are provided rubber buffers 33, 33 on the mutually facing surfaces of the stop part 31 and the upper open end of the second mounting member 14. Thus, the stop part 31 of the first mounting member 12 cooperates with the upper open end of the second mounting member 14 to constitute a bounding stop mechanism for limiting an amount of relative displacement of the first mounting member 12 and the second mounting member 14 toward each other upon application of the vibration in a bounding direction.

The elastic mount 10 further has a partition member 34 and a flexible diaphragm 36 which are superposed on each other such that outer peripheral portions of the partition member 34 and the diaphragm 36 are accommodated in the large-diameter portion 28 of the second mounting member 14, together with a flange portion 74 of a bracket member 38 which will be described. The outer peripheral portions of the partition member 34 and the diaphragm 36, and the flange portion 74 of the bracket member 38 are gripped by and between the shoulder 24 and the calking part 32 of the second mounting member 14, whereby the partition member 34 and the diaphragm 36 are fixed to the second mounting member 14. Accordingly, the lower open end of the second mounting member 14 is fluid-tightly closed by the diaphragm 36, which is a relatively thin rubber layer having a circular shape. In the thus constructed elastic mount 10, the elastic body 16 and the diaphragm 36 closing the upper and lower open ends of the second mounting member 14 cooperate with the second mounting member 14 to define a fluid-tight space 40 filled with a suitable non-compressible fluid. A metal ring 42 is bonded to the outer peripheral portion of the diaphragm 36 so that the diaphragm 36 is effectively gripped by and between the shoulder 24 and the calking part 32 as described above. The non-compressible fluid filling the fluid-tight space 40 is preferably selected from among water, alkylene glycol, polyalkylene glycol and silicone oil, for instance. The filling of the fluid-tight space 40 is advantageously conducted by assembling the partition member 34 and the diaphragm 36 with respect to the intermediate product constituted by the first and second mounting members 10, 12, and elastic body 16, in a mass of the selected non-compressible fluid.

The partition member 34 divides the fluid-tight space 40 into two sections on the axially opposite sides thereof, namely, a pressure-receiving chamber 44 partially defined by the elastic body 16 and an equilibrium chamber 46 partially defined by the diaphragm 36. Upon application of the vibration to the elastic mount 10, the pressure of the fluid in the pressure-receiving chamber 44 varies due to elastic deformation of the elastic body 16, while the volume of the equilibrium chamber 46 is permitted to vary by displacement of the diaphragm 36. The partition member 34 consists of an upper metal plate 48 and a lower metal plate 52 each of which has a generally circular shape, and which are superposed on each other. The upper and lower plates 48, 52 have, at their central portions, recesses and protrusions formed by pressing, so as to define an outer orifice passage 58 and an inner orifice passage 64 between the mutually facing surfaces of the two plates 48, 52. Namely, the outer orifice 58 is formed at a radially outer portion of the partition member 34 and extends over a suitable circumferential length. This radially outer orifice 58 communicates with the pressure-receiving chamber 44 and the equilibrium chamber 46 through respective communication holes 54, 56. On the other hand, the inner orifice passage 64 formed radially inwardly of the outer orifice passage 58 communicates with the chambers 44, 46 through respective communication holes 60, 62. The non-compressible fluid is forced to flow between the pressure-receiving chamber 44 and the equilibrium chamber 46 through the radially outer and inner orifice passages 58, 64, due to a pressure difference between the two chambers 44, 46 upon application of the vibrational load to the engine mount 10.

In the present embodiment, the radially inner orifice 64 has a higher ratio A/L than the radially outer orifice 58, wherein "A" and "L" represent a cross sectional area and length of each orifice 58, 64, respectively. That is, the outer orifice passage 58 is tuned to effectively damp low-frequency large-amplitude vibrations while the inner orifice passage 64 is tuned to effectively damp high-frequency small-amplitude vibrations. For instance, the outer orifice 58 is tuned to exhibit a high damping effect with respect to low-frequency vibrations such as engine shakes based on resonance of the fluid flowing through the orifice passage 58. The inner orifice passage 64 is tuned to exhibit a low dynamic spring constant with respect to high-frequency vibrations such as engine idling vibrations based on resonance of the fluid flowing through the inner orifice 64. In the present embodiment, the radially inner orifice passage 64 constitutes a first orifice while the radially outer orifice passage 58 constitutes a second orifice.

The upper metal plate 48 of the partition member 34 has a large-diameter inverted-cup-shaped portion 66 formed at a central portion thereof while the lower metal plate 52 has a small-diameter inverted-cup-shaped portion 68 formed at a central portion thereof. The top wall of the small-diameter inverted-cup-shaped portion 68 is held in abutting contact with the bottom wall of the large-diameter inverted-cup-shaped portion 66 so as to define the inner (second) orifice 64 which is formed around the small-diameter inverted-cup-shaped portion 68. The communication hole 62 for fluid communication of the inner orifice 64 with the equilibrium chamber 46 is formed through a tapered wall of the small-diameter inverted-cup-shaped portion 68 of the lower metal plate 52 such that the communication hole 62 is open to the central part of the diaphragm 36 via an opening of the small-diameter inverted-cup-shaped portion 68.

The hat-shaped resonance member 22 which is supported by the first mounting member 12 via the support rod 20 is disposed in a central portion of the pressure-receiving chamber 44. The periphery of the resonance member 22 cooperates with the corresponding portion of the inner surface of the pressure-receiving chamber 44 to define an annular restricted fluid passage 70. The resonance member 22 is displaced within the pressure-receiving chamber 44 in the load-receiving direction, together with the first mounting member 12, upon application of the vibrational load to the engine mount 10, so that the fluid in the pressure-receiving chamber 44 is forced to flow through the restricted fluid passage 70. In the present embodiment, the restricted fluid passage 70 is tuned to provide a sufficiently low dynamic spring constant based on resonance of the fluid flow through the restricted passage 70, with respect to high-frequency vibrations such as booming noises generated during high-speed running of the vehicle that can not be effectively damped based on the fluid flows through the outer and inner orifice passages 58, 64.

The bracket member 38 which is secured by calking to the second mounting member 14, together with the partition member 34 and diaphragm 36, includes a cylindrical portion 72 having a relatively large diameter, and the above-indicated flange portion 74 extends radially outwardly of the cylindrical portion 72 from one of the opposite axial open ends thereof. The bracket member 38 further has a mounting plate portion 75 formed at the other axial open end of the cylindrical portion 72 so as to extend in the radially outward direction. The bracket member 38 is secured to the second mounting member 14, with the flange portion 74 superposed on the outer peripheral portion of the diaphragm 36 and calked to the large-diameter portion 28 of the second mounting member 14, such that the cylindrical portion extends in the axial direction away from the second mounting member 14. The bracket member 38 and the second mounting member 14 is attached to the vehicle body (not shown) by means of a bolt, for instance, through the mounting plate 75 of the bracket member 38.

To the bracket member 38 as described above, there is fixedly secured a cover metal member 76 having a cylindrical portion 78 and a bottom portion 80. The cover member 76 is a generally cylindrical member which has a relatively large diameter and which is open at its upper axial end and is closed at its lower axial end. The axially upper part of the cylindrical portion 78 has a diameter slightly larger than the other part thereof, and is press-fitted in the cylindrical portion 72 of the bracket member 38. The cover member 76 is secured to the bracket member 38 such that the open end of the cover member 76 is fixed under pressure to the flange portion 74 of the bracket member 38, and such that the bottom portion 80 of the cover metal member 76 protrudes by a suitable amount from one of the axially opposite openings of the bracket member 36 on the side of the mounting plate portion 75, so that the cover member 76 covers one of the opposite major surfaces of the diaphragm 36 which is remote from the partition member 34.

In a central portion of the cover member 76, there is disposed a pushing member 84 made of metal and having a generally inverted cup shape. The pushing member 84 has a top wall 88 whose outer surface serves as a pressing surface 83 which is flat and has a circular shape. In an interior space of the pushing member 84, a biasing member in the form of a coil spring 86 is disposed in a compressed state between the top wall 88 of the pushing member 84 and the bottom portion 80 of the cover member 76. In this arrangement, the coil spring 86 biases the pushing metal member 84 against the diaphragm 36 such that the open end of the pushing member 84 is spaced away from the bottom portion 80 of the cover member 76 by a suitable amount. Accordingly, the pressing surface 83 of the pushing member 84 is pressed onto the corresponding portion of the diaphragm 36 so that the diaphragm 36 is brought into close contact with the lower metal plate 52 of the partition member 34.

The pushing member 84 further has a flange-like, annular pressure plate 90 integrally formed at its open end so as to extend in a radially outward direction of the pushing member 84. An annular metal ring 92 having a diameter larger than that of the pressure plate 90 is disposed radially outwardly of the pressure plate 90 with a suitable radial distance therebetween. The pressure plate 90 and the metal ring 92 is elastically connected to each other by a disk-like rubber plate 94 interposed therebetween. In other words, the rubber plate 94 is bonded at its inner circumferential portion to the pressure plate 90 formed integrally with the pushing member 84, and at its outer circumferential portion to the metal ring 92, in a vulcanization process of a rubber material of the rubber plate 94, so as to provide an integral structure.

The integral structure of the rubber plate 94 is assembled with the cover member 76 such that the metal ring 92 is press-fitted in the cylindrical portion 78 of the cover member 76. Thus, the rubber plate 94 is air-tightly secured at its outer circumferential portion to the inner circumferential surface of the cylindrical portion 78 of the cover member 76 via the metal ring 92. While the pushing member 84 is upwardly biased by the coil spring 86 so that the pressing surface 83 forces the diaphragm 36 onto the lower metal plate 52 of the partition member 34 as shown in FIG. 1, the rubber plate 94 does not undergo elastic deformation, namely, the rubber plate 94 is substantially free from internal stresses while keeping its original, annular disk-like shape. In other words, with the integral structure of the rubber plate 94 assembled with the cover member 76 as described above, the pushing member 84 forces the diaphragm 36 onto the lower metal plate 52 by only the biasing force of the coil spring 86, and substantially no elastic force of the rubber plate 94 acts to force the pushing member 84 onto the lower metal plate 52.

With the integral structure of the rubber plate 94 assembled with the cover member 76, the enclosed space defined by and between the diaphragm 36 and the cover member 76 is divided into a static pressure chamber 96 and an operating chamber 100, which are located on the opposite sides of the rubber plate 94. That is, the static pressure chamber 96 formed on the side of the open end of the cover member 76 is partially defined by the diaphragm 36, and permits displacement or deformation of the diaphragm 36. The operating chamber 100 formed on the side of the bottom portion 80 of the cover member 76 is connectable to a vacuum source (not shown) via an air conduit 98 formed through a central part of the bottom portion 80. In the present embodiment, the static pressure chamber 96 is always held in communication with the atmosphere via a communication hole 102 formed through the cylindrical portion 78 of the cover member 76.

Figure 2:
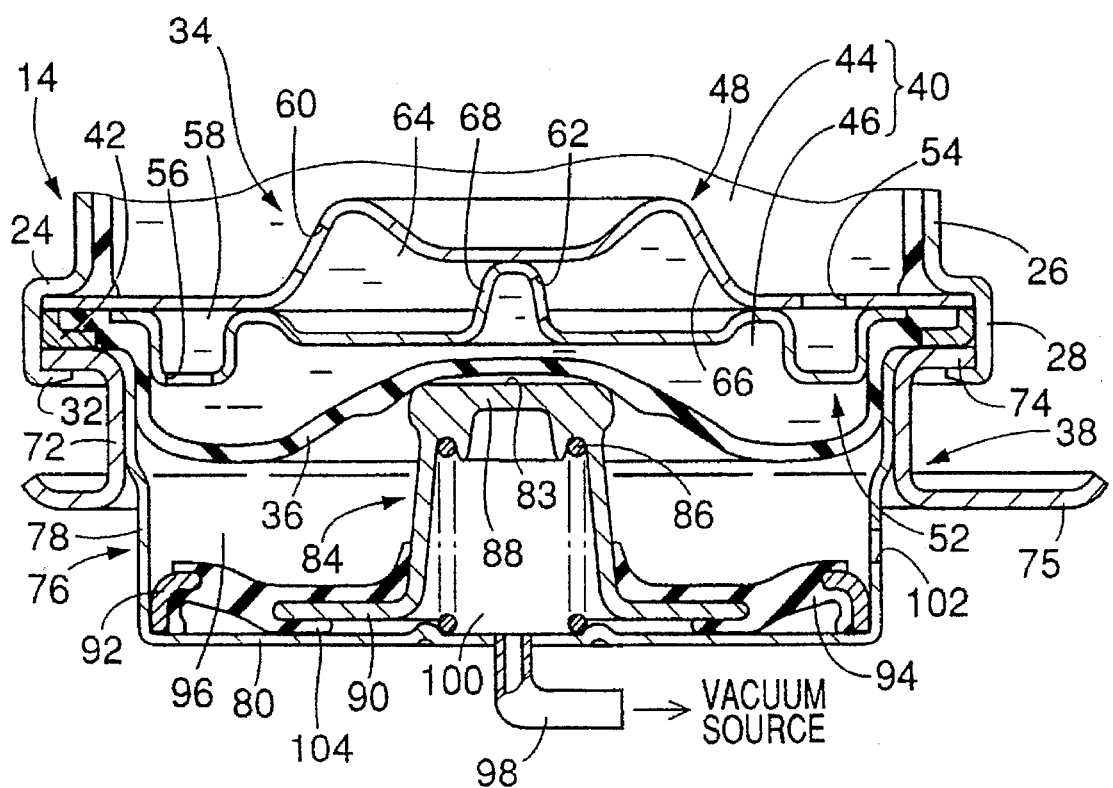
FIG. 2 is a fragmentary view in longitudinal cross section showing a principal part of the engine mount of FIG. 1, in an operating state different from that of FIG. 1.

When the air conduit 98 is open to the atmosphere, the pushing member 84 biased upwardly by the coil spring 86 forces the diaphragm 36 onto the lower metal plate 52, whereby the opening of the small-diameter inverted-cup-shaped portion 68 of the lower metal plate 52 is fluid-tightly closed by the diaphragm 36 to cut the fluid communication between the pressure-receiving chamber 44 and the equilibrium chamber 46 via the communication hole 62, namely, to disable the inner orifice passage 64 to achieve its function. When the air conduit 98 is connected through a suitable switch valve (not shown) to the vacuum source, and the pressure in the operating chamber 100 is accordingly reduced below the atmospheric pressure, the pushing member 84 is retracted toward the bottom portion 80 of the cover member 76 due to a pressure difference between the two chambers 96, 100, against the biasing force of the coil spring 86, so as to move the diaphragm 36 away from the lower metal plate 52 as shown in FIG. 2. Thus, the communication hole 62 formed in the tapered wall of the small-diameter inverted-cup-shaped portion 68 is open to the equilibrium chamber 46, to thereby enable the inner orifice passage 64 to be operative for fluid communication between the two chambers 44, 46.

In the present embodiment, the operating chamber 100 is partially defined by the pressure plate 90 which has a relatively high stiffness and which extends from the open end of the pushing member 84 in the radially outward direction. In this respect, the pressure plate 90 has an effective surface area which receives the negative pressure or vacuum pressure. Accordingly, a suction force based on the negative pressure is stably applied to the pressure plate 90, whereby the pushing member 84 is retracted away from the diaphragm 36 for enabling the inner orifice passage 64 to be operative, by application of a relatively small amount of the negative pressure to the operating chamber 100.

On the lower surface of the pressure plate 90 (on the side of the bottom portion 80 of the cover member 76), there is provided an annular rubber buffer 104 formed integrally with the rubber plate 94, such that the rubber buffer 104 extends along the outer circumferential portion of the lower surface of the pressure plate 90. The rubber buffer 104 is effective to reduce or prevent an abutting noise which would be generated upon abutting contact of the pressure plate 90 with the bottom portion 80 of the cover member 76 when the pushing member 84 is retracted downward away from the diaphragm 36 by the suction force of the negative pressure.

In the engine mount 10 constructed as described above, the operating chamber 100 is connected through the switch valve (not shown) selectively to the atmosphere or to the vacuum source, whereby the diaphragm 36 is forced onto the lower metal plate 52 to close the opening of the small-diameter inverted-cup-shaped portion 68, or retracted away from the lower metal plate 52 to open the opening. Thus, the inner orifice passage 64 is selectively enabled to cut or disabled to permit the fluid communication between the two chambers 44, 46 therethrough. Described more specifically, when the operating chamber 100 is connected to the atmosphere so as to disable the inner orifice passage 64 to cut the fluid communication therethrough, the fluid is caused to flow through the outer orifice passage 58, whereby the engine mount 10 exhibits a sufficiently high damping effect with respect to the low-frequency vibrations based on resonance of the fluid flowing through the outer orifice passage 58. On the other hand, when the operating chamber 100 is connected to the vacuum source through the air conduit 98 so as to enable the inner orifice passage 64 to permit the fluid communication therethrough, the fluid is caused to flow through the inner orifice passage 64 having a lower resistance to the fluid flows than the outer orifice passage 58, whereby the engine mount 10 exhibits a sufficiently low dynamic spring constant with respect to the high-frequency vibrations based on resonance of the fluid flowing through the inner orifice passage 64. Thus, by selectively connecting the operating chamber 100 to the vacuum source and the atmosphere, the fluid is caused to flow selectively through the outer orifice 58 and the inner orifice 64, so that the damping characteristics of the engine mount 10 are suitably changed depending upon the specific frequency of the input vibrations desired to be damped. The present engine mount 10 is capable of providing excellent damping effects over a wide range of frequency of the input vibrations.

In the present engine mount 10, the rubber plate 94 which partially defines the static pressure chamber 96 and the operating chamber 100 is assembled with the cover member 76 such that the rubber plate 94 is substantially free from the load or internal stresses when the operating chamber 100 is not connected to the vacuum source. This arrangement is effective to prevent occurrence of creep in the rubber plate 94. The rubber plate 94 is subject mainly to shearing deformation when the pushing member 84 is retracted away from the diaphragm 36 by application of the negative pressure to the operating chamber 100. Accordingly, the rubber plate 94 does not suffer from a large amount of internal stresses which would be caused by elastic deformation thereof, and accordingly has excellent durability. In the present engine mount 10, therefore, the communication hole 62 of the inner orifice passage 64 is controlled to be open and closed with high stability without being adversely influenced by the conventionally experienced creep or deterioration of the rubber plate 94, whereby the present engine mount 10 exhibits the vibration damping effects with improved durability and high operating reliability.

Since the rubber plate 94 exhibits sufficiently soft spring characteristics due to the shearing deformation thereof upon retracting movement of the pushing member 84, the rubber plate 94 is likely to be easily deformed, so that the pushing member 84 is sucked toward the bottom portion 80 of the cover member 76 with high stability by application of a relatively low level of the negative pressure to the operating chamber 100. In the present invention, by increasing the wall thickness of the rubber plate 94 or suitably selecting the material for the rubber plate 94, the rubber plate 94 is effectively protected from deterioration by heat, and an amount of permeation of the air through the rubber plate 94 is easily controlled. The rubber plate 94 may have a sufficiently high degree of stiffness by increasing its wall thickness or suitably selecting the material thereof, without bonding any reinforcing material, such as canvas, to the rubber plate 94, leading to reduction in the manufacturing cost of the engine mount 10.

In the engine mount 10 constructed according to the present invention, the operating chamber 100 is formed independently of the static pressure chamber 96, so that the diaphragm 36 is not exposed directly to the negative pressure which is applied to the operating chamber 100, whereby the durability of the diaphragm 36 is stably assured. Accordingly, the diaphragm 36 maintains a sufficiently high degree of flexibility with stability, in other words, the diaphragm 36 maintains high capability to permit the volume change of the equilibrium chamber 46. Thus, the present engine mount 10 effectively exhibits the intended vibration damping characteristics.

The present engine mount 10 does not require a pressure medium having a relatively high pressure for pressing the pushing member 84 onto the diaphragm 36 to disable the inner orifice passage 64. Further, a negative pressure obtained in the internal combustion engine of the motor vehicle can be utilized to retract the pushing member 84 from the diaphragm 36. Thus, the vibration damping characteristics of the present engine mount 10 can be changed with a simple structure.

While the present invention has been described in its presently preferred embodiment, it is to be understood that the invention is not limited to the details of the illustrated embodiment, but may be otherwise modified.

The construction of the pushing member 84 is not limited to that of the illustrated embodiment, but may be otherwise constructed as long as the pushing member is adapted to be operated by the biasing force of the coil spring to push the flexible diaphragm to close the communication hole of the first orifice, while the pushing member is retracted by the negative pressure applied to the operating chamber, from the flexible diaphragm against the biasing force of the coil spring.

For instance, the pushing member may be formed of a hard material such as a synthetic resin, or the pushing member may have a hollow structure. Further, the pushing member does not necessarily have the pressure plate.

In the illustrated embodiment, the inner or second orifice passage 64 having a higher ratio A/L (wherein "A" and "L" respectively represent a cross sectional area and a length of each orifice 58, 64) is selectively opened and closed (enabled and disabled) for permitting and cutting fluid communication therethrough. The principle of the present invention may be equally applicable to any other type of a fluid-filled elastic mount, such as a mount having a single orifice passage which is selectively opened and closed to change the vibration damping characteristics, or a mount having a plurality of communication holes for fluid communication of the orifice passage with the equilibrium chamber, so that the cross sectional area and length of the orifice passage are changed depending upon desired vibration damping characteristics, by selectively opening and closing one or more of the communication holes.

The configuration and shapes of the orifice passages are not limited to those of the illustrated embodiment, but may be suitably modified depending upon the required vibration damping characteristics, provided the communication hole of the first orifice which is open to the equilibrium chamber and which is selectively opened and closed by the diaphragm is opposed, via the diaphragm, to the pressing surface 83 of the pushing member 84 which is disposed at a central portion of the cover member.

The resonance member 22 in the illustrated embodiment is not essential to practice the present invention.

While the illustrated embodiment of the invention takes the form of a fluid-filled engine mount for a motor vehicle, it is to be understood that the principle of the invention is equally applicable to various other fluid-filled elastic mounts for use on a motor vehicle and for other applications.

It is further to be understood that the invention may be embodied with various other changes, modifications and improvements which may occur to those skilled in the art, without departing from the spirit and scope of the invention defined in the following claims.

What is claimed is:

1. A fluid-filled elastic mount comprising:
a first and a second mounting member which are spaced apart from each other;
an elastic body which elastically connects said first and second mounting members;
a partition member supported by said second mounting member and cooperating with said elastic body to define a pressure-receiving chamber filled with a non-compressible fluid;
a flexible diaphragm cooperating with said partition member to define an equilibrium chamber on one of the opposite sides of said partition member remote from said pressure-receiving chamber, said equilibrium chamber being filled with the non-compressible fluid;
said partition member having a first orifice communicating with said pressure-receiving chamber and said equilibrium chamber so as to permit flows of said fluid therebetween, said partition member further having at least one communication hole which is open to a central portion of said diaphragm for fluid communication of said first orifice with said equilibrium chamber;
a cover member including a cylindrical portion and a bottom portion, said bottom portion closing one of opposite axial ends of said cylindrical portion, said cover member being supported by said second mounting member at the other axial end of said cylindrical portion so as to partially define a space between said diaphragm and said bottom portion;
a pushing member accommodated in a central portion of said space such that said pushing member is displaceable in a direction toward and away from said communication hole with said diaphragm being interposed therebetween;
a biasing member disposed between said pushing member and said bottom portion of said cover member, for forcing said pushing member onto said diaphragm so that said diaphragm closes said communication hole of said partition member;
an annular rubber plate disposed in a radial space defined by and between an outer peripheral portion of said pushing member and said cylindrical portion of said cover member, such that said rubber plate is free from internal stresses, said rubber plate cooperating with said pushing member to divide said space within said cover member into a static pressure chamber partially defined by said diaphragm, and an air-tightly closed operating chamber partially defined by said bottom portion of said cover member;
said pushing member being sucked toward said bottom portion of said cover member by a negative pressure applied to said operating chamber, so that said diaphragm is displaced away from said communication hole so as to open said communication hole for fluid communication of said first orifice with said equilibrium chamber.

2. A fluid-filled elastic mount according to claim 1, wherein said pushing member has a pressure plate formed as an integral part thereof at an open end thereof so as to extend radially outwardly of said pushing member, said rubber plate being disposed in an annular space between an outer peripheral portion of said pressure plate and said cylindrical portion of said cover member.

3. A fluid-filled elastic mount according to claim 2, said pressure plate is provided at an outer circumferential portion of its lower surface with an annular rubber buffer which abuts on said bottom portion of said cover member when said pushing member is sucked toward said bottom portion.

4. A fluid-filled elastic mount according to claim 1, wherein said pushing member has an inverted cup shape which is open to said bottom portion of said cover member, said biasing member being accommodated in said inverted cup shape of said pushing member.

5. A fluid-filled elastic mount according to claim 1, wherein said pushing member has a metal ring secured to an outer peripheral portion of said rubber plate, said metal ring being press-fitted in said cylindrical portion of said cover member so that said outer peripheral portion of said rubber plate is fixed to said cylindrical portion of said cover member via said metal ring.

6. A fluid-filled elastic mount according to claim 1, wherein said pushing member has a top wall whose outer surface serves as a pressing surface which abuts on said diaphragm for closing said communication hole of said partition member.

7. A fluid-filled elastic mount according to claim 1, further including a second orifice for fluid communication between said pressure-receiving chamber and said equilibrium chamber, said second orifice having a ratio A/L lower than that of said first orifice, wherein "A" represents a cross sectional area of fluid flow through said first and second orifices, and "L" represents a length of said orifices.

8. A fluid-filled elastic mount according to claim 1, wherein said partition member consists of an upper plate having a large-diameter inverted-cup-shaped portion and a lower plate having a small-diameter inverted-cup-shaped portion, said upper and lower plates being superposed on each other to define said first orifice which extends through a radially inner portion of said partition member, and said second orifice which extends through a radially outer portion of said partition member.

9. A fluid-filled elastic mount according to claim 8, wherein said communication hole of said partition member is formed through a tapered wall of said small-diameter inverted-cup-shaped portion of said partition member.

10. A fluid-filled elastic mount according to claim 1, said biasing member includes a coil spring.

11. A fluid-filled elastic mount according to claim 1, wherein said cylindrical portion of said cover member has a communication hole formed therethrough, and wherein said static pressure chamber is connected to an atmospheric pressure through said communication hole.

12. A fluid-filled elastic mount according to claim 1, further including a resonance member supported by said first mounting member and disposed in said pressure-receiving chamber, said resonance member cooperating with an inner surface of said elastic body to define an annular restricted fluid passage.

13. A fluid-filled elastic mount according to claim 1, further including stopper means for limiting an amount of relative displacement of said first and second mounting members in a bounding direction, said stopper means comprising a stop part formed at a part of an outer circumferential portion of said first mounting member so as to protrude in a radially outward direction thereof, said second mounting member having an upper open end which faces said stop part in a load-receiving direction in which the elastic mount receives a vibrational load.

* * * * *